United States Patent [19]

Cordell

[11] 4,242,650
[45] Dec. 30, 1980

[54] ACTIVE VARIABLE EQUALIZER

[75] Inventor: Robert R. Cordell, Tinton Falls, N.J.

[73] Assignee: Bell Telephone Laboratories, Incorporated, Murray Hill, N.J.

[21] Appl. No.: 959,451

[22] Filed: Nov. 13, 1978

[51] Int. Cl.³ .............................................. H04B 3/14
[52] U.S. Cl. .................................. 333/28 R; 307/264;
   330/109; 330/126; 330/151; 330/282; 330/284;
   330/304
[58] Field of Search ............... 333/28 R; 330/86, 109,
   330/126, 145, 151, 282, 284, 304, 254; 307/264

[56] References Cited

U.S. PATENT DOCUMENTS

| | | | |
|---|---|---|---|
| 3,559,084 | 1/1971 | Wise | 330/284 X |
| 3,689,752 | 9/1972 | Gilbert | 307/229 X |
| 3,870,964 | 3/1975 | Mills | 330/284 |
| 3,891,937 | 6/1975 | Bockelmann et al. | 330/254 |
| 3,921,104 | 11/1975 | Gundry | 333/28 R |
| 3,921,105 | 11/1975 | Brglez | 333/28 R |
| 3,950,711 | 4/1976 | Ohkawa | 330/109 X |
| 4,004,253 | 1/1977 | Takasaki et al. | 333/28 R |
| 4,055,818 | 10/1977 | Gay | 333/28 T |

Primary Examiner—Paul L. Gensler
Attorney, Agent, or Firm—Richard B. Havill

[57] ABSTRACT

An active variable equalizer is arranged to provide a Bode type variable equalizer characteristic without requiring an inductor. The equalization shape remains unchanged as the amount of equalization is varied. This equalizer uses a tandem arrangement of additive feed-forward and negative feedback to achieve the mentioned equalization shape.

A circuit interconnects with input and output terminals for combining input and output signals into an intermediate signal having a magnitude equal to a weighted sum of the input and output signals. A frequency dependent circuit responds to the intermediate signal for producing a frequency dependent signal that is combined with the input signal to generate the output signal.

6 Claims, 7 Drawing Figures

ACTIVE VARIABLE EQUALIZER

BACKGROUND OF THE INVENTION

The invention relates to a variable equalizer including an active circuit having a variable transfer characteristic for compensating deviation of a transmission characteristic.

In wire transmission systems using a coaxial cable or a cable pair, the transmission characteristic of the cable varies depending upon the length of the path in the transmission medium and the ambient temperature. A Bode type variable equalizer often is used to compensate for the variation of the transmission characteristic because such an equalizer possesses a unique property in that its equalization shape does not change as the amount of equalization is varied. In mathematical terms, the equalization shape $V(\omega)$ closely approximates an ideal relationship which is expressed as $$V(\omega) = \rho F(\omega) \text{ dB}$$

for $-1 < \rho < +1$, where $V(\omega)$ and $F(\omega)$ are equalization shapes in decibels and $\rho$ is a control parameter which determines the amount and sign of the equalization.

H. W. Bode has shown that a practical transform function which can be represented by an expression $$\frac{1 + xF(s)}{x + F(s)} \text{ for } 0 < x < \infty$$

produces a response characteristic that is very close to the ideal relationship. In this transform function, x is a control parameter for controlling the sign and magnitude of the equalization. The function $F(s)$ is a transfer function of the frequency characteristic produced for maximum equalization, i.e., when the parameter $x = \infty$.

Bode equalizers generally are passive circuits and typically require inductors. As a result, Bode type variable equalizers are not fabricated in integrated circuit form.

Several active variable equalizers without inductors have been disclosed in the prior art. Some of these prior art active variable equalizers, such as those disclosed by F. Brglez in U.S. Pat. No. 3,921,105, are sensitive to variation of both amplifier gain and passive component values because they rely upon positive feedback and/or signal subtraction to achieve equalization. Other prior art active equalizers, such as those disclosed by Y. Takasaki et al. in U.S. Pat. No. 4,004,253, employ overlapping feedforward and feedback loops requiring a pair of closely-matched shaping networks and a wide-ranging control function or a pair of closely-matched wide-ranging control functions.

It is an object to provide an active variable equalizer not requiring an inductor.

It is another object to provide an active variable equalizer having a transfer characteristic such that the equalization shape does not change as the amount of equalization is varied.

SUMMARY OF THE INVENTION

These and other objects of the invention are realized by an active variable equalizer circuit having an input terminal for receiving an input signal and an output terminal upon which an output signal is generated. A circuit interconnects with the input and output terminals for combining the input and output signals into an intermediate signal having a magnitude equal to a weighted sum of the magnitudes of the input and output signals. A frequency dependent circuit responds to the intermediate signal and produces a frequency dependent signal therefrom. A further circuit combines the input signal with the frequency dependent signal into the output signal generated on the output terminal. The equalizer has a transfer function that is proportioned at any selected frequency within a range to an expression $$\frac{1 + xF(s)}{x + F(s)},$$

wherein x is the ratio of the fraction of the frequency dependent signal to the remainder thereof, $F(s) = H(s) + 1$, and $H(s)$ is independent of x.

It is a feature of the invention to use a tandem arrangement of additive feedforward and negative feedback to achieve a Bode type active variable equalizer.

It is another feature to variably combine input and output signals into an intermediate signal equal to a weighted sum of the input and output signals, wherein the intermediate signal is a sum of first and second components, the first component being a portion of the input signal, the second component being a portion of the output signal and wherein the portion of the input signal is proportional to a fraction less than unity and the portion of the output signal is proportional to a remainder of unity less the fraction.

It is another feature of the invention that an active variable equalizer has a transfer function proportioned at any selected frequency within a range to an expression $$\frac{1 + xF(s)}{x + F(s)},$$

wherein x is the ratio of a fraction of the frequency dependent signal to the remainder thereof, $F(s) = H(s) + 1$ and $H(s)$ is independent of x.

It is still another feature to combine an input signal in a feedforward path with an output signal in a feedback path and control gains in the feedforward and feedback paths.

It is a further feature to provide a variable combining circuit including a double-balanced circuit having first and second pairs of emitter-coupled transistors.

It is a still further feature to provide a variable combining circuit including first and second differential pairs of transistors coupling input and output signals, respectively, to the first and second pairs of emitter-coupled transistors, a third differential pair of transistors coupling the control signal as a double-rail signal to first and second base interconnection circuits.

BRIEF DESCRIPTION OF THE DRAWINGS

The above objects and features of the invention will be apparent from the following description of embodiments of the invention when that description is considered in conjunction with the accompanying drawings wherein.

DETAILED DESCRIPTION

Figure 1:
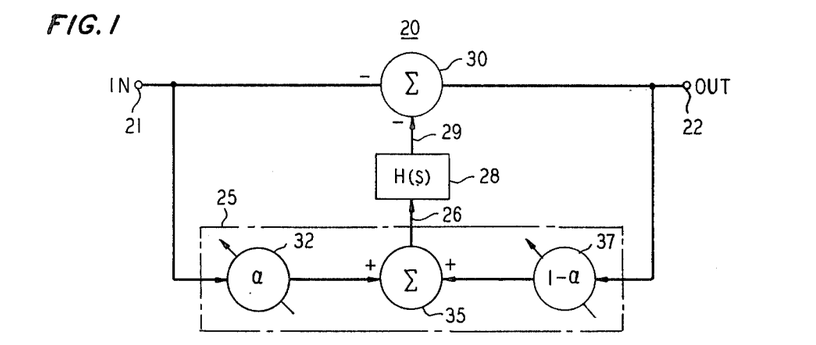
FIG. 1 is a block diagram of an active variable equalizer.

Referring now to FIG. 1, there is shown a topological block diagram of an active variable equalizer circuit 20. The circuit 20 is arranged for receiving an input signal on an input terminal 21 and for generating an output signal on output terminal 22. A circuit 25 combines variably the input signal on terminal 21 with the output signal on the terminal 22 into an intermediate signal occurring on a lead 26. This intermediate signal is applied to an input of a frequency dependent circuit 28 which produces a frequency dependent signal on a lead 29. A circuit 30 is arranged for combining the input signal on terminal 21 with the frequency dependent signal on lead 29 to generate the output signal on terminal 22.

Equalizer circuit 20 includes a feedforward circuit and a feedback circuit. An additive feedforward path starts at the input terminal 21 and proceeds through an attenuator 32 and a summer 35 in the combining circuit 25, the lead 26, the frequency dependent circuit 28, the lead 29, and the combining circuit 30. A negative feedback path includes the output terminal 22 and a loop through an attenuator 37 and the summer 35 in the variable combining circuit 25, the lead 26, the frequency dependent circuit 28, the lead 29, and the combining circuit 30.

In the circuit 25, the variable attenuators 32 and 37 2hen considered together with the summer 35 form a potentiometer, or the variable combining circuit 25 which produces the intermediate signal as a weighted sum of the input and output signals. The variable attenuators 32 and 37 vary in such a way that the intermediate signal is a sum of first and second components. The first component is a portion of the input signal applied to terminal 21. The portion of the input signal is proportional to a fraction $\alpha$ less than one. The second component is a portion of the output signal generated at the terminal 22. The portion of the output signal is proportional to the remainder $1-\alpha$.

The frequency dependent circuit 28 is an arrangement having a frequency dependent transfer function proportional to H(s) from lead 26 to lead 29. That transfer function H(s) is chosen to provide from the input terminal 21 to the output terminal 22 any desired overall equalizer transfer function represented by an expression $$\frac{1 + xF(s)}{x + F(s)},$$

where $F(s) = H(s) + 1$. Transfer function H(s) is independent of x.

The combining circuit 30 is arranged to combine input signals applied by way of a plurality of inputs. Examples of such a combining circuit include both a summer and a summing node. The individual inputs of the summer may have a polarity of either a positive or a negative sense. The particular polarity input used in any specific configuration is selected so that the polarities of the feedforward signal and the input signal are combined constructively, or additively, in the combining circuit 30 and so that the polarities of the feedback signal and the input signal are combined so as to provide negative feedback.

Figure 2:
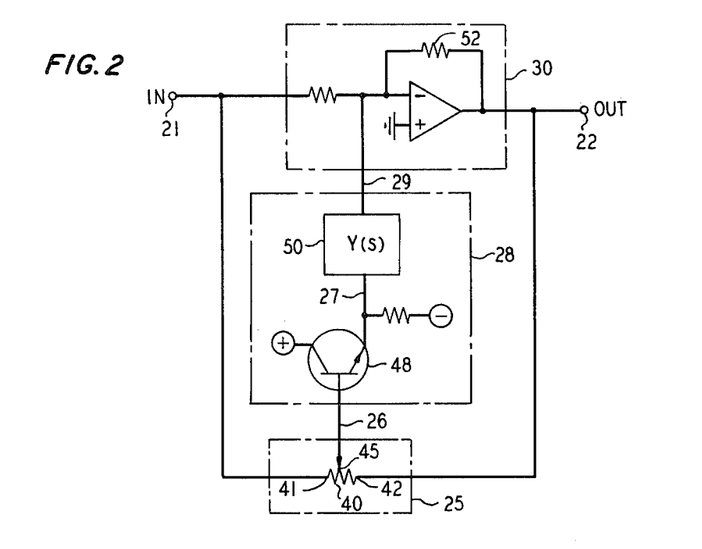
FIG. 2 is a combination of a block diagram and schematic of an active variable equalizer.

Referring now to FIG. 2, there is shown an active variable equalizer circuit similar to the one shown in FIG. 1. In FIG. 2, the variable combining circuit 25 includes a potentiometer 40 having one end 41 connecting with the input terminal 21 for receiving any input signal applied to the terminal 21. A second end 42 of the potentiometer is connected with the output terminal 22 for looping any output signal back through the frequency dependent circuit 28. An adjustable tap 45 of the potentiometer connects through the lead 26 to the input of the frequency dependent circuit 28.

The potentiometer 40 produces on the tap 45 and lead 26 an intermediate signal which is a weighted sum of the input and output signals, as described with respect to the operation of the equalizer of FIG. 1. As the tap position is adjusted along the length of the potentiometer, the attenuation of input and output signals, applied to the ends, varies in a complementary fashion. Thus as the attenuation of the input signal increases, the attenuation of the output signal decreases and vice versa.

Frequency dependent circuit 28 includes an input buffering emitter-follower connected transistor 48 and a frequency dependent admittance network 50. The input buffering is arranged to prevent circuit loading and to assure that the frequency characteristic of the circuit 28 is not a function of the tap position along the length of the potentiometer. Network 50 is an arrangement having a frequency dependent voltage-to-current transfer function Y(s) from lead 27 to lead 29. That transfer function Y(s) is chosen to provide from the input terminal 21 to the output terminal 22 any desired overall equalizer transfer function represented by the expression described with respect to FIG. 1.

Combining circuit 30 is represented by an operational amplifier summer having the input terminal 21 and the lead 29 connected with the inverting input of the amplifier for combining the input signal with the additive feedforward and the negative feedback signals into the output signal that is generated on output terminal 22.

Because of a known virtual short characteristic at the inverting input of the operational amplifier in the combining circuit 30, a resistor 52 in the combining circuit 30 converts the current signal on lead 29 to a voltage. Thus in the transfer function, representing the arrangement of the frequency dependent circuit 28 of FIG. 2, $H(s) = Y(s) \cdot R$, where R is the resistance of resistor 52.

Figure 3:
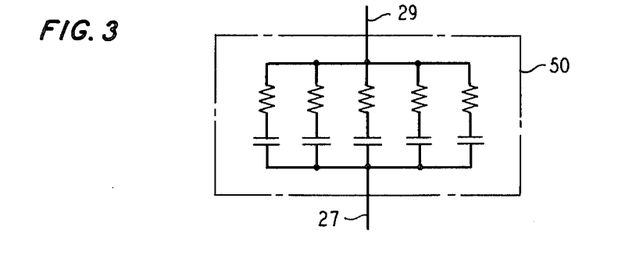
FIG. 3 is a schematic diagram of a frequency dependent circuit.

Referring now to FIG. 3, there is shown an exemplary frequency dependent admittance network 50 including several branches in parallel with each other. Each branch includes a series resistance-capacitance circuit. There are enough parallel paths to reduce resulting error of the transfer function H(s) to an acceptable level. Error in the function H(s) is determined with respect to a desired frequency characteristic such as the characteristic shown in FIG. 4.

Figure 4:
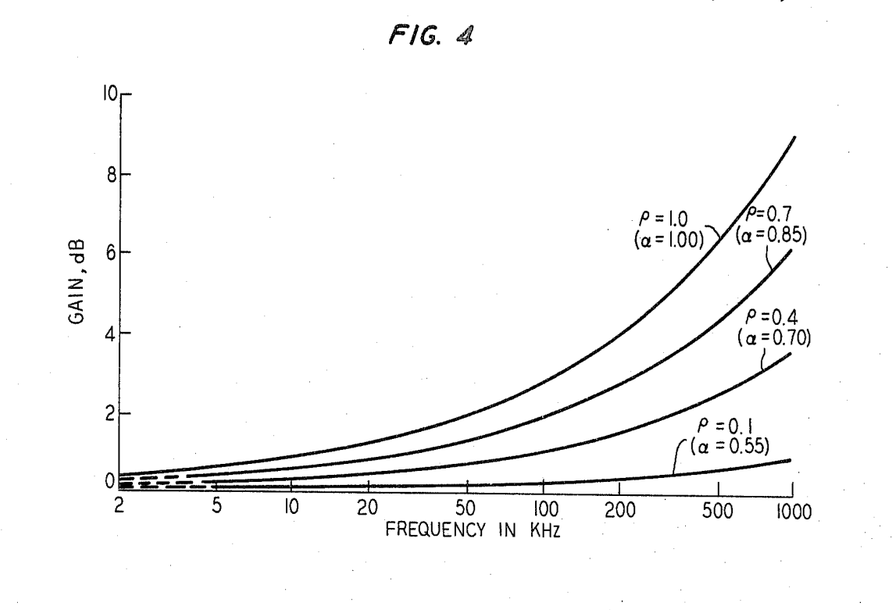
FIG. 4 is a diagram of a variable equalizer response characteristic.

It is known that monotonically increasing admittance with increasing frequency as shown in FIG. 4 is produced by a network like the network 50 shown in FIG. 3. In that network each series combination of a resistor and capacitor produces a pole and zero combination. The particular poles and zeros, and therefore the appropriate circuit elements, are selected to produce the desired admittance characteristic within acceptable error limits. A convenient method for selecting values of resistance and capacitance utilizes a known iterative computer optimization technique.

It is noted that other frequency dependent characteristics, including nonmonotonic ones, can be realized in the active variable equalizer by utilizing other frequency dependent admittance networks.

Referring now to FIG. 4 there is shown a family of variable equalizer frequency response characteristics typical of the response characteristics which can be realized by the arrangements of FIGS. 1 and 2. These response characteristics represent different amounts of "square root of F" equalization, wherein equalization in decibels is proportional to the square root of frequency. Equalizers having such characteristics are used for providing equalization in wire transmission systems. These response characteristics are best achieved using Bode type variable equalizers, wherein the equalization shape remains unchanged as the amount of equalization is varied.

The frequency response characteristics shown are for several representative values of an equalization control parameter $\rho$. Although not specifically shown in FIG. 4, it is to be understood that additional curves, which are symmetrical with those shown, are applicable directly to negative values of the parameter $\rho$. Corresponding values of another equalization control parameter, i.e., the previously mentioned fraction $\alpha$, are shown in parentheses under their counterpart values of the parameter $\rho$. The value of the fraction $\alpha$ is related to the value of the parameter $\rho$ by the expression $$\alpha = \frac{\rho + 1}{2}.$$

The response characteristics of FIG. 4 are realized by the active variable equalizers shown in FIGS. 1 and 2 by properly choosing the transfer functions H(s) and Y(s).

Selection of the proper response characteristics for H(s) and Y(s) is simple because at $\rho = 1$, for maximum equalization, F(s) equals H(s)+1. Thus, given any desired F(s), a designer selects H(s) equal to F(s)−1.

Figure 5:
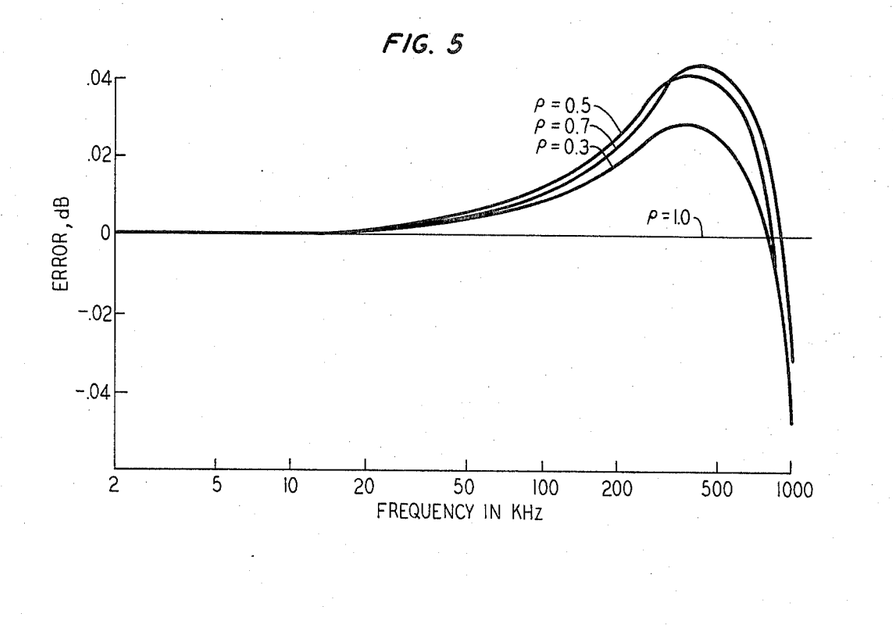
FIG. 5 is a diagram of error resulting from a variable equalizer characteristic.

Referring now to FIG. 5, there is shown a family of variable equalizer error characteristics for an equalizer having the response characteristics shown in FIG. 4. It is to be understood that the variable equalizer is a circuit having a frequency response characteristic that is a close approximation of the ideal response characteristic which is represented by the expression $$V(\omega) = \rho F(\omega) \text{ dB}$$

for $-1 < \rho < 1$.

The error curves shown in FIG. 5 depict the departure of the variable equalizer response characteristic from the ideal response characteristics. Error curves corresponding to several representative values of the parameter $\rho$ are shown. It is noted that a symmetrical set of error curves exists for negative values of the parameter $\rho$ but is not shown in FIG. 5. Resulting error is minimized when the parameter $\rho$ equals −1.0, zero and +1.0. Maximum error, which is less than 0.05 dB, is quite small. Equalizers of types other than the Bode type do not provide adjustable equalization with such small error.

The following describes how the arrangement disclosed herein provides a response characteristic corresponding to the response characteristic of the variable equalizer disclosed by Bode. The Bode type variable equalizer characteristic is known to be satisfied by any equalizer circuit having a transfer function V(s) represented by the expression $$V(S) = \frac{1 + xF(s)}{x + F(s)} \text{ for } 0 < x < \infty,$$

where F(s) is a transfer function representing maximum equalization and x is a control parameter having a range from zero to infinity. The parameter x determines both the magnitude and the sign of equalization. Thus for example when $x = 0$, $V(s) = 1/F(s)$;
when $x = 1$, $V(s) = 1$;
when $x = \infty$, $V(s) = F(s)$.

Disclosures relating to passive variable equalizers have defined the control parameter $\rho$ in terms of the parameter x. That definition is represented by the expressions $$\rho = \frac{x - 1}{x + 1} \text{ and } x = \frac{1 + \rho}{1 - \rho} \text{ for } -1 < \rho < +1.$$

It is noted that the control parameter $\rho$ has a range from −1 to +1 rather than the range of zero to infinity used for parameter x.

By inserting the expression for parameter x in terms of the control parameter $\rho$ into the expression for the transfer function V(s), that transfer function can be represented by the expression $$V(s) = \frac{[1 + F(s)] - \rho[1 - F(s)]}{[1 + F(s)] + \rho[1 - F(s)]} \text{ for } -1 < \rho < +1.$$

A key to understanding my contribution results from following some additional manipulation of the transfer function. This further manipulation commences with a further redefinition of the equalization control parameter and the restriction of its range to a range of zero to unity. The new parameter is the fraction $\alpha$ which has been mentioned previously. The fraction $\alpha$ satisfies the expressions $$\alpha = \frac{\rho + 1}{2}$$
$$\rho = 2\alpha - 1 \quad \text{for } 0 < \alpha < 1.$$

By substituting for $\rho$ in terms of $\alpha$ in the expression for the transfer function V(s), that transfer function can be represented by the expression $$V(s) = \frac{1 + \alpha[F(s) - 1]}{\alpha + [1 - \alpha]F(s)} \text{ for } 0 < \alpha < 1.$$

This expression for the transfer function V(s) in terms of $\alpha$ can be rearranged into $$V(s) = \frac{1 + \alpha[F(s) - 1]}{1 + (1 - \alpha)[F(s) - 1]}$$
and -continued
$$V(s) = \frac{1 + \alpha H(s)}{1 + (1 - \alpha)H(s)},$$

where $H(s) = F(s) - 1$.

The circuits of FIGS. 1 and 2 provide such a transfer function because of the additive feedforward arrangement and the negative feedback arrangement. The numerator of the transfer function $V(s)$ is accomplished by the additive feedforward arrangement provided in those circuits. Therein the magnitude of the signal, shaped by the circuit 28 and fed forward, is controlled by the fraction, or parameter $\alpha$. Similarly the denominator of the transfer function $V(s)$ is accomplished by the negative feedback arrangements provided in FIGS. 1 and 2. The magnitude of the signal, shaped by the circuit 28 and fed back, is controlled by a complement of parameter $\alpha$, i.e., the remainder $1 - \alpha$ which was mentioned previously.

Although the embodiments of FIGS. 1 and 2 describe specific feedforward and feedback arrangements, it is noted that the transfer function $V(s)$ in terms of $\alpha$ shows that in general active variable equalizers of the Bode type can be made by tandem arrangements of feedback and feedforward circuits.

Control functions represented by the fraction $\alpha$ and the remainder $1 - \alpha$ can be realized as separate variable attenuators, however, an advantage of the present invention is that a single control element such as a potentiometer can provide both of those control functions.

Further advantages include the fact that the control parameter need only vary over a moderate range (e.g., zero to unity) to achieve the full range of the equalizer and the fact that the amount of equalization in decibels at any given frequency is a linear function of the control parameter $\alpha$.

Figure 6:
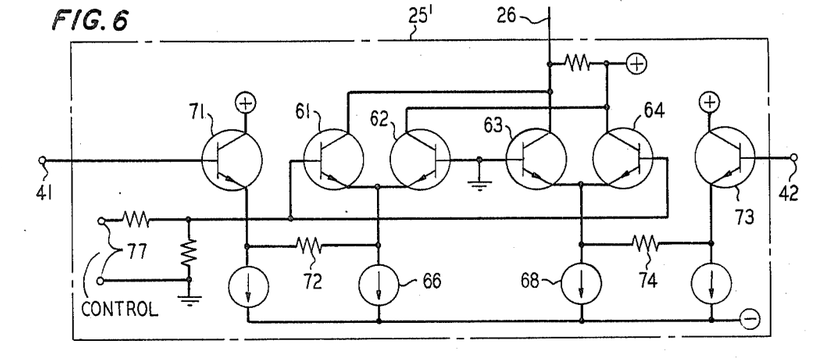
FIG. 6 is a schematic diagram of an electronic potentiometer.

Referring now to FIG. 6, there is shown in detail an electronic potentiometer, or variable combining circuit, 25' that can be substituted into the arrangement of FIGS. 1 and 2. Elements of FIGS. 1 and 2 having counterparts in FIG. 6 are assigned the same designators in the three figures.

Four transistors 61, 62, 63 and 64 form a double-balanced circuit with a pair of emitter-coupled transistors 61 and 62 being coupled to a d.c. current source 66 and a pair of emitter-coupled transistors 63 and 64 being coupled to a d.c. current source 68. Bases of transistors 62 and 63 are connected together. Bases of transistors 61 and 64 are interconnected for receiving a d.c. control signal. Collectors of the transistors 61 and 63 are interconnected to the lead 26, and the collectors of the transistors 62 and 64 are interconnected directly to a positive supply.

Equalizer input and output signals are applied directly to the variable combining circuit 25'. Equalizer input signals are applied through one end terminal 41 and are buffered through an emitter-follower connected transistor 71. A resistor 72 couples the buffered input signal to the common emitter circuit of the transistors 61 and 62 while converting the input signal from a voltage to a current. Equalizer output signals are applied through the opposite end terminal 42 and are buffered through another emitter-follower connected transistor 73 to the common emitter circuit of the transistors 63 and 64. A resistor 74 couples the buffered output signal to the common emitter circuit of the transistors 63 and 64 and converts that signal from a voltage to a current.

The d.c. control signal is applied through the terminals 77 to the interconnected bases of the transistors 61 and 64 for determining the fraction of bias currents conducted through the transistors 61 and 64 with the remainders being conducted, respectively, through the transistors 62 and 63. Interconnected bases of the transistors 62 and 63 are grounded for reference purposes. Signals applied at the terminals 41 and 42 are divided according to the division of the bias currents. The signal produced on the lead 26 results from signal currents in the collector circuits of the transistors 61 and 63 and is a combination of the fraction $\alpha$ of the input signal applied to the terminal 41 and the remainder $1 - \alpha$ of the output signal applied to the terminal 42.

It is noted that the fraction of the input signal and the remainder of the output signal vary as complements of each other. When the control signal is zero, the bias currents divide equally in both pairs of emitter-coupled transistors, and the combined signal on lead 26 includes equal amounts of the signals applied at terminals 41 and 42. When the control signal has a positive polarity, the bias current in the transistor 61 increases and the bias current in the transistor 63 decreases. Therefore the combined signal produced on lead 26 includes a greater portion of the signal applied to terminal 41 and a smaller portion of the signal applied to terminal 42. The converse is true for a control signal having a negative polarity. From this interaction, it is understood that the intermediate signal on the lead 26 is a combination of the signals on the terminals 41 and 42 and that combination varies in a complementary fashion. The combination is proportional to the fraction $\alpha$ of the input signal on terminal 41 and the remainder $1 - \alpha$ of the output signal on terminal 42.

Operation of the variable combining circuit 25' in response to the control signal is analogous to the operation of a mechanical potentiometer in response to changing the wiper position. Both arrangements combine variable amounts of signals applied to their end terminals. The combined signal is produced on the lead 26.

The double-balanced circuit insures that the total d.c. current of the collector circuits of the transistors 61 and 63 remains constant regardless of the value of the control voltage. The d.c. voltage on lead 26 therefore is independent of the control voltage and control signal feedthrough is thus prevented.

Input and output signals are coupled into the double-balanced circuit in a distortion reducing and reference level adjusting arrangement. Transistor 71 and the emitter-coupled pair of transistors 61 and 62 are operated as a differential circuit having resistor 72 as a degeneration resistor. The d.c. bias current for transistor 71 should equal the current supplied by the source 66 to the pair of transistors 61 and 62 to minimize distortion. Because of this arrangement the input signal applied to terminal 41 can be centered at a d.c. reference equal to ground potential. Transistor 73 and the emitter-coupled transistors 63 and 64 are arranged similarly with respect to the output signal applied to the terminal 42.

Because the base-emitter junction characteristics of the transistors 61, 62, 63 and 64 are nonlinear, the relationship between the control voltage and the portions of the input and output signals combined on lead 26 in nonlinear. This electronic potentiometer has a logarithmic taper that is advantageous for volume controls.

Figure 7:
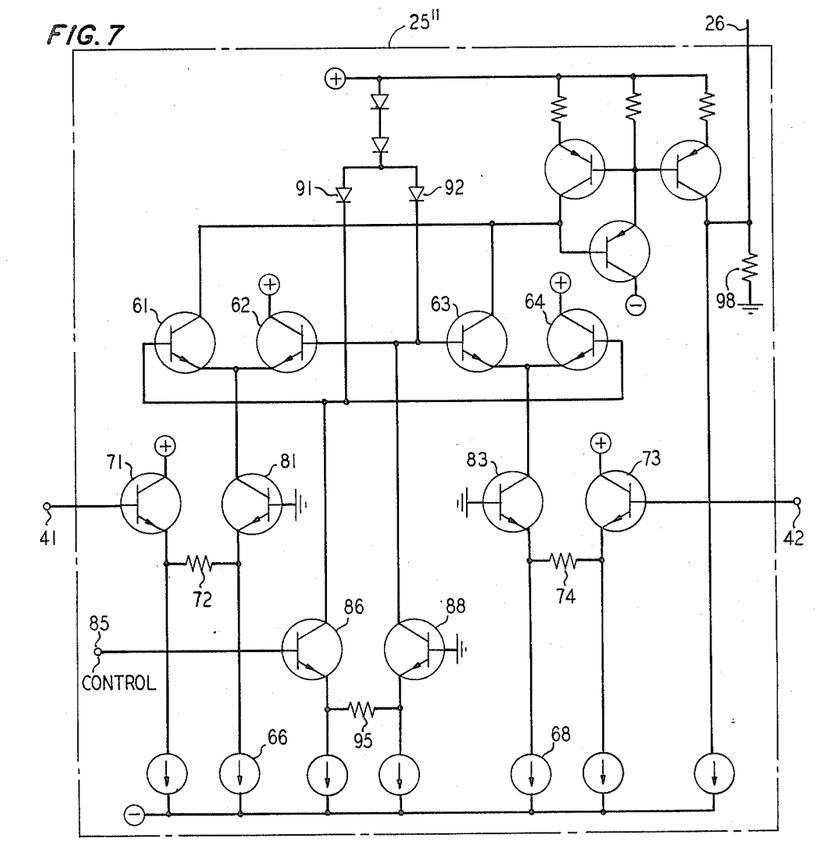
FIG. 7 is an alternative arrangement of an electronic potentiometer.

Referring now to FIG. 7, there is shown an alternative electronic potentiometer 25'' that can be substituted into the arrangement of FIGS. 1 and 2. Elements of FIGS. 1, 2 and 6 having counterparts in FIG. 7 are assigned the same designators in the several figures. The basic configuration and operation of the circuit of FIG. 7 is similar to the operation of the circuit of FIG. 6. Only differences in the arrangement and operation are discussed and therefore highlighted in this description of FIG. 7.

Buffering of the equalizer input and output signals applied to the electronic potentiometer 25" is accomplished through differential pairs of transistors. A transistor 81 is paired differentially with the transistor 71 so that signal current injected into the emitters of transistors 61 and 62 is conducted through the transistor 81. A transistor 83 is paired similarly with the transistor 73 for injecting signal current into the emitters of the transistors 63 and 64. Resistors 72 and 73 are included for providing emitter degeneration for the differential pairs of transistors. These differential arrangements minimize distortion and provide a greater flexibility in the selection of d.c. voltage levels. With this arrangement, the bases of transistors 61, 62, 63 and 64 reside at a higher level than in the embodiment of FIG. 6 so that the control signal applied to terminal 85 is centered about zero volts d.c.

An active control circuit including another differential pair of transistors 86 and 88 is used for obtaining a linear control characteristic for a control signal centered about zero volts d.c. reference. The control voltage is converted to a pair of complementary control currents by the differential pair of transistors 86 and 88. These control currents are reconverted to voltages by a pair of load diodes 91 and 92 for application to the interconnected bases of the transistors 61 and 64 and the interconnected bases of transistors 62 and 63 which are not grounded in FIG. 7. Nonlinearity produced by the diodes 91 and 92 is complementary to the input characteristic of the differential pairs of transistors 61, 62 and 63, 64 so that the ratio of currents between transistors 61 and 62 and between transistors 63 and 64 is identical to the ratio of currents between transistors 86 and 88. A desirable linear control characteristic results and is very useful for an active variable equalizer. Resistor 95 connected between the emitters of the transistors 86 and 88 is selected to determine a desired control characteristic gain. Although positive and negative polarity supply voltages are shown, those voltages are not necessarily symmetrical.

A current mirror is included in the collector circuits of the transistors 61 and 64 to turn around the resulting combined current signal and to permit flexibility in choosing the reference voltage for the potentiometer tap signal generated on lead 26. A load resistor 98 converts the combined current signal to a voltage on the lead 26. In this case, the d.c. reference voltage chosen for the tap signal is ground potential. Thus all input and output signals can be referenced to the same potential, e.g., ground potential, for providing simple direct coupled signal interfaces.

The foregoing description presents in detail the arrangement and operation of illustrative variable equalizers embodying the invention. These embodiments together with other embodiments obvious to those skilled in the art are considered to be included within the scope of the invention.

I claim:

1. An active variable equalizer having an input terminal for receiving an input signal, an output terminal upon which an output signal is generated, and a transfer function between the input and output terminals, the equalizer being characterized by a circuit interconnected with the input and output terminals for variably combining the input and output signals into an intermediate signal equal to a weighted sum of the input and output signals, wherein the intermediate signal is a sum of first and second components, the first component being a portion of the input signal, the second component being a portion of the output signal and wherein the portion of the input signal is proportional to a fraction less than unity and the portion of the output signal is proportional to a remainder of unity less the fraction, a frequency dependent circuit having a transfer function proportional to H(s) and responsive to the intermediate signal for producing a frequency dependent additive feedforward signal and a negative feedback signal, means for combining the input signal with the additive feedback signal and with the negative feedback signal into the output signal generated on the output terminal, and the equalizer transfer function is proportional to an expression $$\frac{1 + xF(s)}{x + F(s)},$$

wherein x is a ratio of the fraction to the remainder, F(s)=H(s)+1, and H(s) is independent of x.

2. An active variable equalizer in accordance with claim 1 wherein the variably combining circuit is further characterized by a double-balanced circuit having first and second pairs of emitter-coupled transistors with a control signal being coupled to a first interconnection between the bases of a first transistor in each pair of emitter-coupled transistors, the input signal being coupled into the common emitter circuit of the first pair of emitter-coupled transistors, the output signal being coupled into the common emitter circuit of the second pair of emitter-coupled transistors, and a second interconnection between the bases of a second transistor in each pair of emitter-coupled transistors, the intermediate signal being produced at an interconnection between a collector of the first transistor of the first pair of emitter-coupled transistors and a collector of the second transistor of the second pair of emitter-coupled transistors.

3. An active variable equalizer in accordance with claim 1 wherein the variably combining circuit is further characterized by a double-balanced circuit having first and second pairs of emitter-coupled transistors with a control signal being coupled to a first interconnection between the bases of a first transistor in each pair of emitter-coupled transistors, the input signal being coupled into the common emitter circuit of the first pair of emitter-coupled transistors, the output signal being coupled into the common emitter circuit of the second pair of emitter-coupled transistors, a second interconnection between the bases of a second transistor in each pair of emitter-coupled transistors, and the intermediate signal being produced at an interconnection between a collector of the first transistor of the second pair of emitter-coupled transistors and a collector of the second transistor of the first pair of emitter-coupled transistors.

4. An active variable equalizer in accordance with claim 2 or 3 wherein the variably combining circuit is further characterized by a first differential pair of transistors coupling the input signal to the common emitter circuit of the first pair of emitter-coupled transistors, a second differential pair of transistors coupling the output signal to the common emitter circuit of the second pair of emitter-coupled transistors, a third differential pair of transistors coupling the control signal as a double-rail signal to the first and second interconnections, and a pair of load diodes connected to the first and second interconnections for converting control current to control voltage.

5. An active variable equalizer having an input terminal, an output terminal and a transfer function between the input and output terminals, the equalizer comprising a constructive feedforward circuit connected to the input terminal and having a controlled gain in a frequency dependent feedforward path, a negative feedback circuit connected to the output terminal and having a controlled gain in a frequency dependent feedback path, means included within the feedforward and feedback paths for combining an input signal in the feedforward path with an output signal in the feedback path and for controlling the gains of the feedforward and feedback paths, a common frequency dependent circuit having a transfer function proportional to $H(s)$ included within the feedforward path for producing a constructive feedforward signal and within the feedback path for producing a negative feedback signal, means for combining the input signal with the constructive feedforward signal and the negative feedback signal into the output signal at the output terminal, the gains of the feedforward and feedback paths being varied in response to different settings of the controlling means in a complementary fashion so that when the gain in the feedforward path is proportional to a fraction less than unity, the gain in the feedback path is proportional to the remainder of unity less the fraction, and the equalizer transfer function is proportional to an expression $$\frac{1 + xF(s)}{x + F(s)},$$

wherein x is a ratio of the fraction to the remainder, $F(s) = H(s) + 1$, and $H(s)$ is independent of x.

6. An electronic potentiometer comprising first and second end terminals and a tap, a double-balanced circuit having first and second pairs of emitter-coupled transistors, a first interconnection between base electrodes of a first transistor in each pair of emitter-coupled transistors, a first differential pair of transistors for coupling a first signal from the first end terminal into a common emitter circuit of the first pair of emitter-coupled transistors, a second differential pair of transistors for coupling a second signal from the second end terminal into a common emitter circuit of the second pair of emitter-coupled transistors, a second interconnection between base electrodes of a second transistor in each pair of emitter-coupled transistors, a combination of the first and second signals being produced on the tap connected at an interconnection between a collector of the first transistor of the first pair of emitter-coupled transistors and a collector of the second transistor of the second pair of emitter-coupled transistors, a third differential pair of transistors coupling a control signal as a double-rail signal to the first and second interconnections, and means connected to the first and second interconnections for converting control current to control voltage.

* * * * *

UNITED STATES PATENT AND TRADEMARK OFFICE
CERTIFICATE OF CORRECTION

PATENT NO. : 4,242,650
DATED : December 30, 1980
INVENTOR(S) : Robert R. Cordell It is certified that error appears in the above—identified patent and that said Letters Patent is hereby corrected as shown below:

Col. 3, line 38, "2hen" should read --when--. Col. 6, line 12, in the equation, "V(S)" should read --V(s)--. Col. 8, line 63, "lead 26 in" should read --lead 26 is--. Col. 10, line 21, "feedback", first occurrence, should read --feedforward--.

Signed and Sealed this

Second Day of June 1981

[SEAL]

Attest:

RENE D. TEGTMEYER

*Attesting Officer*  *Acting Commissioner of Patents and Trademarks*